Inventor:
Clyde W. McCarty
by, Richard E. Horley
His Attorney

Inventor:
Clyde W. McCarty
by, Richard E. Horley
His Attorney

United States Patent Office 2,855,551
Patented Oct. 7, 1958

2,855,551

SERVOMOTOR SYSTEM ADAPTED FOR MEASURING

Clyde W. McCarty, Lynn, Mass., assignor to General Electric Company, a corporation of New York Application June 27, 1955, Serial No. 518,079

8 Claims. (Cl. 318—28)

This invention relates generally to improvements in that class of measuring apparatus embodying a servomotor for continuously achieving rebalance of a normally balanced measuring circuit adapted to become unbalanced in response to changes in a condition being measured, and in particular relates to improvements in the means relied upon to achieve effective and reliable damping or braking of the servomotor to thereby prevent the measuring apparatus from hunting or overshooting when achieving rebalance.

Such measuring apparatus normally has associated therewith a recorder and the inertia effects of the recorder mechanism and the servomotor combine to cause potential overshooting of the system when it is attempting to achieve rebalance, particularly in view of the relatively high operating speeds utilized for rapid rebalancing. Additionally, rapid rebalancing must be achieved for both large and small changes in the condition being measured and this further aggravates the problem of overshooting.

Desirably, the measuring apparatus should rapidly respond to both large and small changes in the condition under observation without any overshooting of the apparatus beyond the control point for precise rebalance. For example, when measuring furnace temperature that may vary several hundred degrees in a very short time, such as an increase from 100 degrees C. to 400 degrees C., the measuring system should sense this change and rapidly rebalance at 400 degrees C. The recorder, and any associated control components operated by the recorder, should rapidly assume new positions corresponding to the 400 degree temperature and the moving parts of the recorder and any associated control components should travel rapidly and continuously to their new positions corresponding to 400 degrees and stop, without any overtravel. Otherwise, the recorder will display a temperature change exceeding that which actually occurred and the associated control components will initiate condition controlling effects in excess of that actually required to either establish steady state control at 400 degrees or return the furnace to its original temperature of 100 degrees, whichever is required for proper process control. If overtravel occurs, the system will immediately try to rebalance in the opposite direction to achieve the correct rebalance at 400 degrees and the entire system will thus hunt or oscillate significantly about the correct point of rebalance.

Heretofore damping of the servomotor has been attempted with different forms of mechanical devices, such as friction brakes, viscous fluid damping devices and the like, but such mechanical damping arrangements have been found to be unsuitable for use in connection with modern measuring apparatus wherein high speed recording is an essential requirement.

Also, it has been the practice in the past to use different forms of electrical damping devices wherein means were associated with the measuring apparatus to develop a voltage upon rotation of the servomotor in opposition to the voltage driving the servomotor, such that the opposing voltage could achieve effective damping. This opposing voltage has in some instances been generated with the use of auxiliary generators coupled to the servomotor drive shaft with the phasing or sense of the output of the generator properly arranged to obtain an effect opposing the voltage driving the servomotor. Additionally, attempts have also been made to utilize the dynamic braking characteristic of the servomotor itself, whereby the usual counter E. M. F. developed in the motor windings upon rotation thereof could be availed of to develop the effect which could then be opposed to the driving voltage. Such forms of electrical damping have been effective, but in the case of the auxiliary generator, additional loading is imposed on the measuring system and the system is also burdened with the cost of the generator. In those systems where attempts have been made to utilize the dynamic braking characteristics of the servomotor itself, resort has been to relatively complicated networks or special forms of servomotors, either of which unnecessarily adds to the complexity and cost of the measuring apparatus.

It is therefore an object of the present invention to provide improved and simplified damping arrangements for the servomotor normally used in the class of measuring apparatus described.

It is another object of the invention to provide an improved and simplified damping arrangement for a two-phase induction servomotor that does not require any modification of the motor design.

It is yet another object of the invention to provide improved and simplified damping arrangements for a servomotor that can also serve the function of stabilizing the operation of the electronic circuit utilized to drive the servomotor.

It is a still further object of the invention to provide an improved and simplified damping arrangement for a servomotor that is driven by an electronic amplifier having at least one stage thereof operating with a saturating characteristic and wherein the damping arrangement cooperates advantageously with the amplifier to provide stable, effective and reliable control of the servomotor.

Briefly, in one aspect thereof, the invention comprises the use of a feedback network connected between the input and output sides of an electronic amplifier that is utilized to drive a two-phase induction motor forming a part of a measuring system of the class described. The electronic amplifier has its input side coupled to a normally balanced condition-responsive measuring network and has its output side coupled to one of the two windings in the induction motor. The normally balanced measuring network is adapted to develop an alternating current signal in response to changes in the condition being measured, and this signal will vary in magnitude and phase depending upon the extent of the change in condition and its sense of change.

The alternating current signal is impressed upon the input side of the electronic amplifier and is amplified therein resulting in a strong alternating current signal being impressed upon the control winding of the induction motor. The other winding of the induction motor is connected to a suitable power source, and the connections to the motor are arranged to provide the proper phasing between the two windings for rotation of the motor.

The output side of the electronic amplifier has connected thereto a feedback network which operates to divert a portion of the output of the amplifier and feed it back to a stage of amplification prior to the last stage of amplification in the amplifier. The feedback connection operates to stabilize the amplifier in a known manner and also operates to provide necessary damping as required. When the servomotor is rotating in response to an output signal in the form of a voltage coming from the electronic amplifier, a counter voltage, opposite in phase to the input voltage feeding the motor, will be induced in the control winding and when the motor approaches its rebalance position, this counter-induced voltage can be utilized to provide effective and reliable dynamic braking of the motor such that the motor will come to rest at its precise rebalancing position without any overtravel.

Normally, the feedback voltage in the electronic amplifier circuit operates in the known manner to stabilize the gain of the amplifier during the period when the motor is accelerating in response to an unbalance in the measuring network. Since one of the stages of amplification is operating with a saturating characteristic, this feedback during acceleration of the motor will normally produce no damping effects whenever the change in the condition being measured is relatively large. When the motor reaches its running speed and approaches the point of rebalance, the error signal coming into the input side of the electronic amplifier will start to fade away, and the voltage on the output side of the electronic amplifier corresponding to the input signal, will, in a like manner, begin to fade away. However, since the motor is running at its rated speed, the counter-voltage induced in the control winding will be fed back through the feedback network connected to the amplifier, and since its phase is in opposition to the phase of the driving signal, the amplifier will have a tendency to reverse itself and drive the motor in a reverse direction. Of added significance is the fact that the induced voltage being fed back from the control winding will stabilize the effective impedance of that part of the amplifier looking into the motor winding and this impedance will be stabilized at a sufficiently low value as to permit effective dynamic braking of the servo motor.

The feedback network may be provided with adjustable means to permit control of the magnitude of the feedback voltage. The feedback network may also be provided with a phase-shifting network to compensate for any material departure from correct phase relationships between the feedback voltage and the signal passing through the amplifier.

In one form of the invention, the feedback network may include no more than a dropping resistor with or without an adjustable resistor for controlling the magnitude of the feedback signal. In another form of the invention a condenser may be added to the feedback network to obtain proper phasing of the feedback signal.

The objects of the invention and the benefits and advantages resulting therefrom will be best understood upon reference to the detailed description set forth below when taken in conjunction with the drawings annexed hereto in which.

Figure 1:
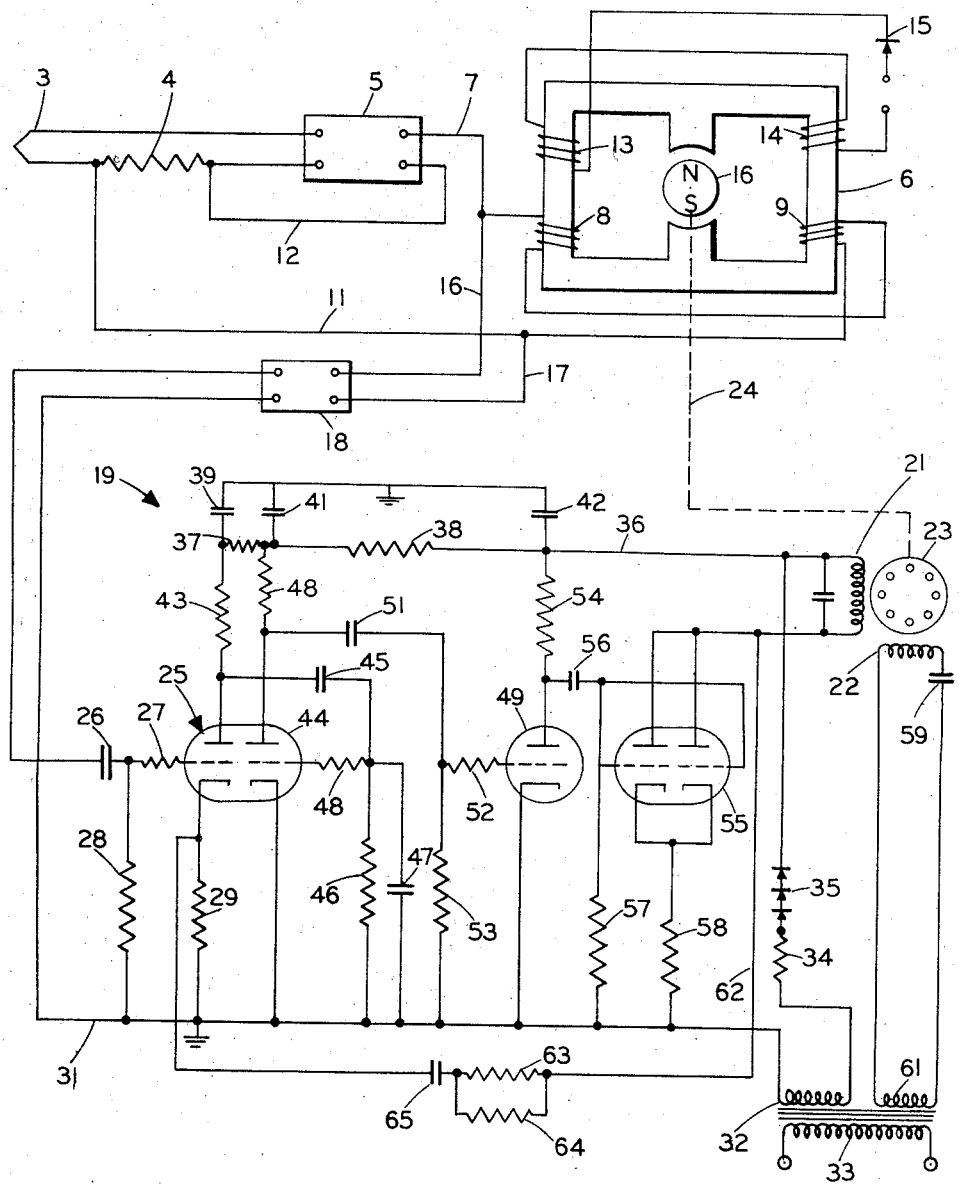
Figure 1 is a circuit diagram illustrating the application of the invention to a measuring system responding to a condition detector having a unidirectional output signal.

Referring first to Figure 1, it is seen that the measuring system includes a thermocouple 3 in series with a balancing resistor 4 and connected across the input terminals of a direct current amplifier device 5. The amplifier 5 is connected on its output side to a magnetic balancing unit 6 and to the balancing resistor 4. One terminal of the amplifier goes to the magnetic unit 6 via the conductor 7 and has in series therewith the control windings 8, 9 which are wound upon the outer legs of the unit 6 and from these windings the output of the amplifier is connected via conductor 11 to one side of the resistor 4. The other terminal of the output side of the amplifier 5 is connected via conductor 12 to the other side of resistor 4.

Also wound on the outer legs of the balancing unit 6 are a pair of series connected exciting windings 13, 14 which are connected to a suitable source of alternating current supply through a rectifier 15. The center leg of the unit 6 has an air gap therein in which is mounted for rotation a permanent magnet which, in the form illustrated, comprises the cylindrical body 16 having its poles diametrically opposing one another as shown.

The circuit so far described is similar to the measuring network shown in U. S. Patent No. 2,680,222—Schweig, issued June 1, 1954, and assigned to the assignee of the instant application. As is clearly set forth in the aforesaid Schweig patent, the direct current windings 8, 9, which are connected in series opposition, provide in the magnetic unit 6 a first component of magnetic flux which passes in the same direction, either up or down selectively, through the outer legs of the unit. Since the exciting windings 13, 14 are connected in series and to the alternating current energy source through rectifier 15, a pulsating current flows therein and this produces a pulsating component of magnetic flux which passes in opposite directions through the outer legs of the unit 6, for example, downward through the left leg and upward through the right leg.

The permanent magnet 16, in its neutral position as shown, also provides a second component of unidirectional magnetic flux in the unit 6 which passes in the same direction, either up or down selectively, through the outer legs of the unit. The value of this second component of unidirectional flux is determined by the angular position of the magnet 16, and the magnet is so arranged that its flux component opposes the flux component resulting from the direct current windings 8, 9.

For any position of the magnet 16, there is a corresponding magnitude of direct current in the windings 8, 9 whereby the flux generated by the windings 8, 9 will be essentially cancelled by the flux generated by the permanent magnet 16. So long as these unidirectional fluxes cancel each other, there is no alternating signal induced in the windings 8, 9 as a result of the pulsating flux generated by the exciting windings 13, 14. However, if the thermocouple circuit responds to a change in the condition being measured to effect a corresponding change in the magnitude of direct current in the windings 13, 14, an error flux will exist in the unit 6 and because the magnetic unit 6 is a saturating device, the error flux will cause the exciting windings 13, 14 to induce an A. C. error voltage in the D. C. windings, whose magnitude depends upon the extent of the change in the condition being measured and whose phase depends upon the sense of this change. For example, if the neutral position of the unit 6 corresponds to a predetermined magnitude of temperature being sensed by the thermocouple 3, an increase in temperature will result in an A. C. error voltage having one phase, and a decrease in temperature will produce an A. C. error voltage 180 degrees out of phase with the signal produced on a temperature increase.

The error voltage developed by the balancing unit 6 is taken from the windings 8, 9 via the conductors 16, 17 through a filter 18 where it is then coupled to the input side of an electronic amplifier generally indicated at 19. The output side of amplifier 19 is coupled to the control winding 21 of a two-phase induction motor having a power winding 22 and a squirrel cage rotor 23. The rotor 23 of the induction motor is mechanically coupled to the permanent magnet 16 by means of any conventional mechanical linkage indicated at 24 whereby the induction motor operates to position the permanent magnet for rebalancing of the measuring apparatus. Suitable control actuating components and a conventional recording and indicating device may be also mechanically coupled to the induction motor and driven thereby, and with such devices coupled to the motor, it is apparent that considerable inertia forces are developed upon rotation of the motor which must be compensated for to provide rebalancing without overtravel of the motor.

The electronic amplifier 19 in the embodiment illustrated has a plurality of stages of amplification, each stage including at least one triode, one of the intermediate triodes operating with a saturating characteristic.

The error voltage is coupled to the first stage of amplification which is the triode 25 forming one-half of a conventional twin-triode electronic tube. Triode 25 has a plate, control grid, and cathode and a suitable heater for the cathode, and it is seen that the error signal is coupled to the control grid through a coupling condenser 26, having a stopping resistor 27. A grid leak 28 is provided to establish bias on the control grid and a cathode resistor 29 is also provided to regulate the performance of the triode in a known manner. A common grounded conductor 31 provides a negative return path for all of the triodes in the amplifier 19 and is connected at one end to the conductor 17 coming from the balancing unit 6 and is connected at its other end to one side of secondary 32 forming a part of a source of A. C. power having a primary 33. The other end of the secondary winding 32 passes through a dropping resistor 34 and a plurality of rectifying units 35, after which it is connected to the common lead 36, which in turn is connected to all of the plates of the triodes of the amplifier to impress thereupon the necessary plate voltage for operation of the amplifier. A filtering network, comprising the resistors 37, 38 and the condensers 39, 41 and 42, is provided in the plate circuit of the triodes and for triode 25 a suitable plate impedance 43 is connected therein.

The error signal being impressed upon the triode 25 is coupled to the control grid of triode 44 forming the other half of the twin triode electronic tube containing triode 25. A suitable coupling condenser 45 and grid leak 46 and by-pass condenser 47 are provided to operate in the known manner and there is also provided a stopping resistor 48. The cathode of tube 44 is connected to the common return conductor 31 and the plate of triode 44 is connected to the plate supply line 36 through the plate resistor 48. The amplified output of triode 44 is coupled to the control grid of triode 49 via the coupling condenser 51, stopping resistor 52, and grid leak resistor 53. A suitable plate resistor 54 is provided in the plate circuit of triode 49 and connects the triode with the plate supply line 36. The cathode for triode 49 is connected to the common return conductor 31. This triode amplifies the signal impressed thereon and its output is coupled to the last stage of amplification which in the illustrated embodiment is a twin triode tube 55 having each half connected in parallel as shown. The amplified signal developed by triode 49 is coupled to tube 55 via a coupling condenser 56 and a grid leak resistor 57. A cathode resistor 58 is included in the cathode circuit of tube 55 and connects the tube to the common return line 31. The plate voltage for the tube 55 comes from the common plate supply line 36 through the control winding 21 of the induction motor. The output of the tube 55 controls the operation of the induction motor causing it to rotate in one direction or the other, depending upon the phase of the output signal.

The A. C. voltage developed on the output side of the electronic amplifier is of proper phase to drive the servomotor in one direction corresponding to one direction of the change in the condition being measured and the output voltage may be of opposite phase to drive the servomotor in a reverse direction corresponding to an opposite change in the condition being measured. The servomotor may be provided with a condenser 59 in its power winding circuit to obtain the 90 degree phase relationship between the power and control windings. The power for the motor 23 may be taken from the source through the primary winding 33 and secondary winding 61, but, of course, it is to be understood that direct connections to the power lines would be just as effective, depending upon the magnitude of the voltage found desirable to work with in the servomotor.

To accomplish the necessary damping of the servomotor, a feedback network is connected between the output side of amplifier 19 and its input side via the conductor 62, a phase-shifting network comprising the parallel resistors 63, 64 and condenser 65. In the arrangement shown, the conductor 62 is connected into the common plate circuit of tube 55 at one end and into the cathode circuit of tube 25 at the other end.

When a signal reaches the amplifier 19, it is suitably amplified and a portion of the output voltage is diverted through the feedback network and in a known manner operates to stabilize the overall gain of the amplifier 19. For a very small input signal coming to the amplifier wherein the servomotor can accomplish rebalancing during acceleration of the motor, the signal diverted and fed back will also operate to damp the operation of the motor and permit rebalancing without overtravel. Under most conditions of operation, the input signal to the amplifier is relatively large and the output signal is high enough to rapidly accelerate the servomotor to its maximum speed and run it at this speed for the desired length of time to accomplish rebalancing. Since the gain of the particular amplifier shown is 5 million to 1, one of the triodes has a saturating characteristic of operation and in the arrangement shown, it is the triode 49 which functions in this manner. This limits the signal going into the output stage of amplification so that under these conditions the motor runs at constant speed for the major portion of its rebalancing action. This saturating characteristic improves the sensitivity of the amplifier and also operates to effectively screen out any tendency of the feedback network to produce damping during acceleration and initial constant speed running of the servomotor.

As the motor drives the magnet 16 to rebalance the measuring network, the error signal coming from the balancing unit 6 begins to fade away and in a like manner the amplified output from the tube 55 begins to fade away. By this time, the servo motor has been running at full speed and the distortion of the fluxes developed in the power and control windings due to rotation in the servo motor has resulted in a substantial counter voltage being induced in the control winding. This counter e. m. f. being coupled into the relatively low impedance plate circuit of tube 55 permits the motor to brake itself through the well known phenomena of dynamic braking. At the same time, the counter voltage is diverted through the feedback network and causes the amplifier to tend to reverse itself and drive the servo motor in the opposite direction. This effect also contributes to the damping of the servo motor, and the feedback voltage that is subsequently amplified and coupled to the tube 55 further enhances the dynamic braking of the servo motor by retaining and stabilizing the impedance of the plate circuit seen by the servo motor.

The phase-shifting network is provided in the feedback connection to compensate for a rather substantial shift in phase occurring between the input and output sides of the amplifier. The phase-shifting network provides the proper phase relationship between the feedback voltage and the signal voltage coupled to the triode 25. Where there is no significant shift in the phase of the error signal as it passes through the amplifier 19, the condenser 65 could be dispensed with, and such a circuit is shown in Figure 2.

Additionally, the parallel resistors 63, 64 need not be used, as one resistor in place thereof will accomplish the necessary damping if its value of resistance is properly correlated to the speed of the induction motor. For convenience in manufacture, the feedback circuit normally includes only resistor 63, but for applications of the measuring system requiring higher recording speeds, the resistor 64 is conveniently added across the resistor 63 to accomplish the necessary damping.

Figure 2:
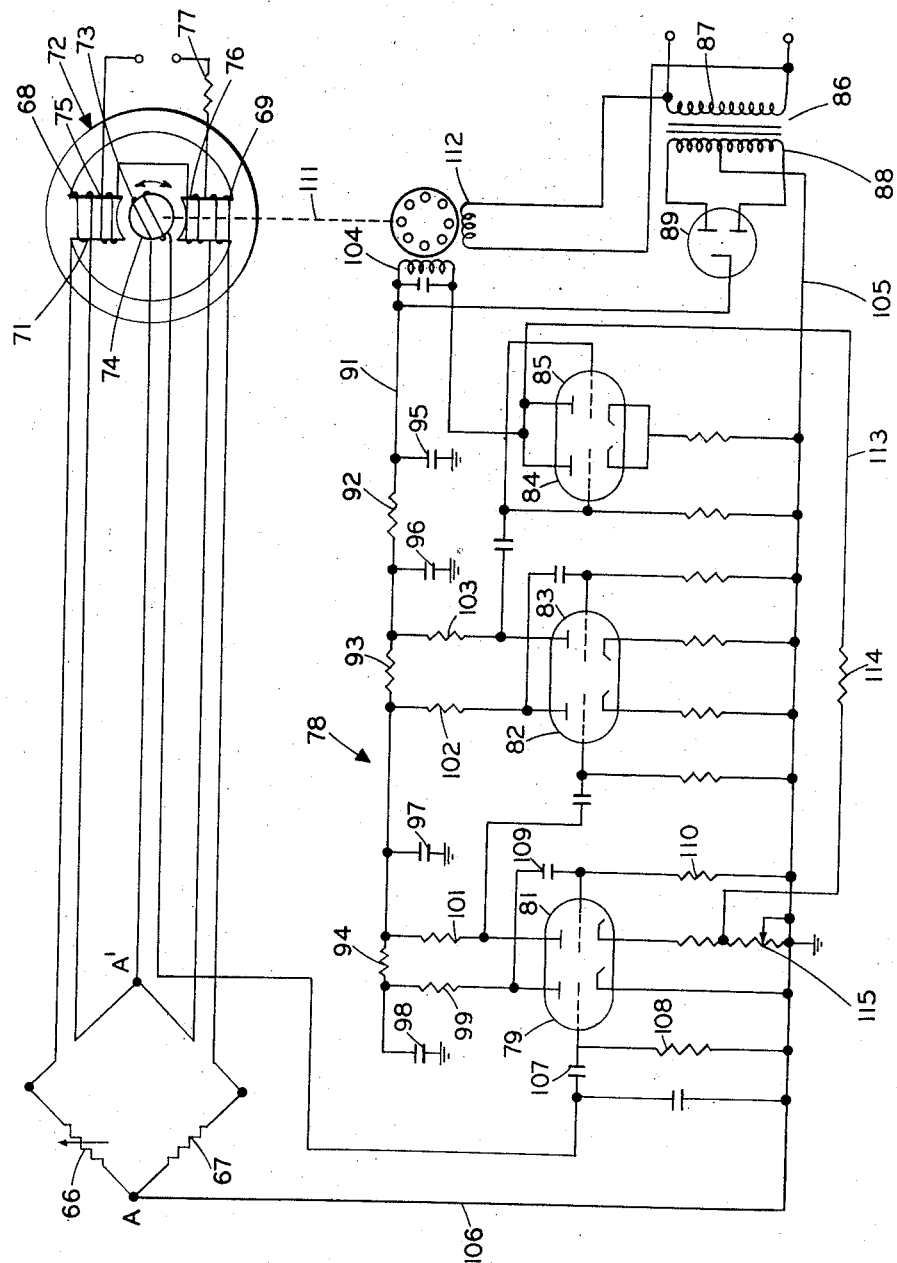
Figure 2 is a diagram of the invention as used in connection with a measuring system wherein the condition detector develops a fluctuating output signal.

Referring now to Figure 2, it is seen that the detecting and balancing networks of Figure 1 have been replaced by a bridge arrangement which develops an A. C. error voltage in response to changes in the condition being measured. The amplifier has been modified slightly over that shown in Figure 1, but operates in essentially the same manner as amplifier 19.

Thus, the condition-responsive element is a temperature-responsive resistor 66 forming one arm of a bridge, the other arms being the fixed resistor 67 and the inductance windings 68, 69 mounted on the diametrical leg 71 of the core member 72. Leg 71 is provided with an air gap in which is mounted for rotation an armature coil 73 surrounding an auxiliary core member 74. The windings 68, 69 may be regarded as secondary windings that are excited by the primary windings 75, 76 also surrounding center leg 71 and connected in series across a suitable source of A. C. power through a resistor 77. The primary windings produce an A. C. magnetic flux in the core 72 and in the air gap provided in leg 71. The secondary windings thus not only make up two arms of the bridge circuit, but they also transfer excitation voltage to the circuit from the primary windings. These secondary windings are so constructed that the voltage induced therein by the alternating magnetic flux is the same in each.

Since the armature 73 is mounted in the air gap, and the major portion of the magnetic flux which links the primary coils and the secondary coils passes through the armature, a voltage is induced in the armature. The magnitude of the induced voltage depends upon the angular position of the armature in the air gap.

The bridge circuit is so arranged that when the measuring system is at rest, that is, in a state corresponding to a predetermined condition, the voltage induced in the armature 73 is equal in magnitude and opposite in phase to the voltage across the terminals A, A' of the bridge circuit. Since the A. C. error voltage coupled to the amplifier equals the algebraic sum of these two voltages, there is no input signal going to the amplifier and the servo motor will remain at rest.

A change in the resistance of the condition-responsive resistor 66 causes unbalance of the bridge and results in either an increase or a decrease in the magnitude of the voltage between terminals A, A'. At the instant of change, the induced voltage in armature 73 differs in phase and in magnitude from the voltage across terminals A, A' and this difference is coupled to the input side of the electronic amplifier generally indicated at 78.

Since the impedance of amplifier 78 and its associated servo motor is relatively high, the balance of the bridge will be unaffected thereby and the error voltage coupled to the input side of the amplifier will have a magnitude depending upon the extent of the change in the condition affecting resistor 66, and it will have a phase depending upon the sense of this change.

Like the amplifier 19, it is seen that the amplifier 78 includes first and last stages of amplification and a plurality of intermediate stages of amplification, each stage having at least one triode amplifier therein and one of said stages having a saturating characteristic of operation.

The triodes are generally indicated at 79, 81, 82, 83, 84 and 85 and are arranged in conventional twin-triode electronic tubes, all of which are provided with suitable heaters for their cathodes. Power is supplied to the plates of each of the tubes from a source of A. C. power constituting the transformer 86 having its primary winding 87 across the source and its secondary winding 88 across the plates of a conventional full-wave rectifier tube 89. The common cathode of the tube 89 is connected by a suitable electrical conductor to a common plate supply line 91 in which there are a series of filtering arrangements comprising the resistors 92, 93, 94 and condensers 95, 96, 97, 98. Each of the tubes 79, 81, 82, and 83 has its plate connected to the plate supply line 91 through a suitable plate resistor 99, 101, 102 and 103 respectively. The plates of triodes 84, 85, which are connected in parallel, are tied together and connected to the common plate supply line 91 through the control winding 104 of a two-phase induction motor driven by amplifier 78.

The grids and cathodes of all of the triodes are connected to a common cathode return conductor 105, which has one end thereof connected to the terminal A by way of conductor 106, and the other end thereof connected to the midpoint of the secondary winding on transformer 86.

The A. C. error voltage coming from the bridge is coupled to the grid of triode 79 through a conventional coupling condenser 107. As in the amplifier 19, the control grid of triode 79 is connected to the common cathode return through a grid leak resistor 108. The amplified error voltage developed at the plate of triode 79 is coupled to the grid of triode 81 through a suitable coupling condenser 109, this grid in turn being coupled to the common cathode return by the grid leak resistor 110.

The output of triode 81 is coupled in a like manner to the grid of triode 82, which in turn has its output coupled to the grid of triode 83, which in turn has its output coupled to the grids of triodes 84 and 85. Suitable grid leak resistors and cathode biasing resistors are provided in the grid-to-ground and cathode-to-ground connections for each of the triodes, and suitable coupling condensers are utilized to couple the successive stages of amplification.

Thus it is seen that the A. C. error voltage coupled to the input side of amplifier 78 is amplified and coupled from the output side of the amplifier to the control winding 104 of the servo motor. This motor has a suitable power winding 112 connected to a power source, and with the proper phase relationship existing between the windings 104 and 112, the motor will rotate in a direction depending upon the phase of the error voltage driving it. Since the error voltage can be either of two phases displaced from each other by 180 degrees, it is obvious that the servo motor can be driven in either of two directions. The proper phasing between windings 104 and 112 is achieved through the resistor 77 used in the primary circuit of the inductance arms of the bridge.

The arrangement is such that the servo motor drives the armature 73, by means of any suitable mechanical coupling indicated at 111, to a new position wherein the voltage induced therein is again equal and opposite to the voltage across terminals A, A' of the measuring bridge, at which time the error voltage coupled to the input side of amplifier 78 is reduced at zero. When this condition is reached, the servo motor should be at rest.

To ensure that the servo motor comes to rest at the precise point of rebalance in the measuring system, a feedback network is coupled from the output side of the amplifier 78 to its input side. This feedback network comprises the conductor 113 including therein fixed resistor 114 and adjustable resistor 115.

As in the amplifier 19, one of the intermediate stages of amplification has a saturating characteristic of operation and the feedback network operates in precisely the same manner as the feedback network described in connection with amplifier 19.

Since the stopping resistors utilized in amplifier 19 have been eliminated in amplifier 78, there is no significant phase shift of the error voltage through the amplifier and for this reason, no condenser is necessary in the feedback network. The stopping resistors 27, 48 and 52 were provided in amplifier 19 to compensate for any undesirable out-of-phase voltages coming through with the error voltage from the balance unit 6, and since no such undesirable out-of-phase voltage components come from the bridge, the stopping resistors were eliminated in amplifier 78 as was the condenser 65. To provide a convenient method of controlling the degree of damping in the system, the variable resistor 115 is connected as shown.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. In measuring apparatus having a normally balanced electrical network adapted to be unbalanced in response to changes in a condition and including a device that is adjustable to rebalance said network upon occurrence of said change, the combination of: an electronic amplifier having input and output sides and a plurality of stages of amplification responsive to network unbalance, a two-phase induction motor for adjusting said device, said motor having a power and a control winding, said amplifier having its input side coupled to said network and its output side coupled to said control winding, one of said stages of amplification having a saturating characteristic of operation, and a passive negative feedback network coupled between said output of said plural stage amplifier and at least one of said amplifier stages prior to said amplifier having a saturating characteristic of operation.

2. In measuring apparatus having a normally balanced electrical network adapted to be unbalanced in response to changes in a condition and including a device that is adjustable to rebalance said network upon occurrence of said change, the combination of: an electronic amplifier having input and output sides and a plurality of stages of amplification responsive to network unbalance, a two-phase induction motor for adjusting said device, said motor having a power and a control winding, said amplifier having its input side coupled to said network and its output side coupled to said control winding, one of said stages of amplification having a saturating characteristic of operation, and a negative feedback network coupled between said output of said plural stage amplifier and an amplifier stage of said plural stage amplifier prior to said amplifier stage having a saturating characteristic of operation, whereby negative feedback is obtained between different stages of said plural stage amplifier, said feedback network including a phase-shifting network and consisting of passial components.

3. In measuring apparatus having a normally balanced electrical network adapted to be unbalanced in response to changes in a condition and including a device that is adjustable to rebalance said network upon occurrence of said change, the combination of: an electronic amplifier having a plurality of stages of amplification responsive to network unbalance, each stage of amplification including one or more triode amplifiers, one of said intermediate triode amplifiers having a saturating characteristic of operation, a two-phase induction motor for adjusting said device, said motor having a power and a control winding, said amplifier having its first stage of amplification coupled to said network and its last stage of amplification coupled to said control winding, one of said triodes in one of said stages of amplification ahead of said saturating triode amplifier and last stage of amplification having a resistor in its cathode return circuit, and a negative feedback network coupled between said last stage of amplification and the cathode side of said cathode resistor.

4. In measuring apparatus having a normally balanced electrical network adapted to be unbalanced in response to changes in a condition and including a device that is adjustable to rebalance said network upon occurrence of said change, the combination of: an electronic amplifier having a plurality of stages of amplification responsive to network unbalance, each stage of amplification including one or more triode amplifiers, one of said intermediate triode amplifiers having a saturating characteristic of operation, a two-phase induction motor for adjusting said device, said motor having a power and a control winding, said amplifier having its first stage of amplification coupled to said network and its last stage of amplification coupled to said control winding, one of said triodes in one of said stages of amplification ahead of said saturating triode amplifier and last stage of amplification having a resistor in its cathode return circuit, and a negative feedback network coupled between said last stage of amplification and the cathode side of said cathode resistor, said cathode resistor being adjustable to control the magnitude of said feedback.

5. In measuring apparatus having a normally balanced electrical network adapted to be unbalanced in response to changes in a condition and including a device that is adjustable to rebalance said network upon occurrence of said change, the combination of: an electronic amplifier having first and last stages of amplification and a plurality of intermediate stages of amplification responsive to network unbalance, one of said intermediate stages of amplification having a saturating characteristic of operation, said first stage being adapted to receive an incoming fluctuating electrical signal and said last stage being adapted to generate an outgoing fluctuating electrical signal out of phase with respect to said incoming signal, a two-phase induction motor for adjusting said device, said motor having a power and a control winding, said amplifier having its first stage of amplification coupled to said network and having its last stage of amplification coupled to said control winding, and means for diverting a portion of said outgoing fluctuating signal comprising a passive negative feedback network coupled between said last stage of amplification and one of said stages of amplification prior to said saturating stage and said last stage, said prior stage of amplification having a resistor in its cathode return circuit, and the feedback coupled to the cathode side of said resistor, said feedback network including a phase-shifting network, said feedback network including adjustable means for controlling the magnitude of said outgoing signal diverted through said feedback network.

6. The measuring apparatus as claimed in claim 3 wherein said feedback network includes a phase-shifting network.

7. In measuring apparatus having a normally balanced electrical network adapted to be unbalanced in response to changes in a condition and including a device that is adjustable to rebalance said network upon occurrence of said change, the combination of: an electronic amplifier having a plurality of stages of amplification and responsive to network unbalance, a two-phase adjusting motor for adjusting said device, said motor having a power winding and a control winding, said amplifier having its first stage of amplification coupled to said network and its output stage coupled to said control winding of said motor, at least one of said intermediate amplifier stages having a saturating characteristic of operation, at least one of said stages of amplification ahead of said saturating amplifier and said output stage of amplification having a resistor in its cathode circuit, and a negative feedback network consisting of passive elements coupled between said last stage of amplification and the cathode side of said cathode resistor.

8. The apparatus as claimed in claim 7 wherein the magnitude of said cathode resistor is adjustable in order to control the magnitude of said feedback.

References Cited in the file of this patent

UNITED STATES PATENTS

| 2,547,621 | Chapman | Apr. 3, 1951 |
| 2,595,034 | Wild | Apr. 29, 1952 |
| 2,692,358 | Wild | Oct. 19, 1954 |

FOREIGN PATENTS

| 678,520 | Great Britain | Sept. 3, 1952 |

UNITED STATES PATENT OFFICE
CERTIFICATE OF CORRECTION

Patent No. 2,855,551                          October 7, 1958

Clyde W. McCarty

It is hereby certified that error appears in the printed specification of the above numbered patent requiring correction and that the said Letters Patent should read as corrected below.

Column 9, line 48, for "passial" read -- passive --.

Signed and sealed this 29th day of March 1960.

(SEAL)
Attest:
KARL H. AXLINE
Attesting Officer

ROBERT C. WATSON
Commissioner of Patents